(12) United States Patent
Sgarbi et al.

(10) Patent No.: US 6,362,139 B1
(45) Date of Patent: Mar. 26, 2002

(54) AIR CONDITIONING AND REFRIGERATION SYSTEM USING A SULFUR CONTAINING POLAR COMPOUND

(76) Inventors: Tony Pio Sgarbi, 146 Sugarberry Dr., Houston, TX (US) 77024; Teresa Leigh Barr, 1730 Landes St., Port Townsend, WA (US) 98368

( * ) Notice: Subject to any disclaimer, the term of this patent is extended or adjusted under 35 U.S.C. 154(b) by 0 days.

(21) Appl. No.: 09/563,217

(22) Filed: May 2, 2000

(51) Int. Cl.[7] .................. C10M 133/00; C10M 135/20; C09K 5/04
(52) U.S. Cl. ........................ 508/551; 252/68; 508/569; 508/570
(58) Field of Search ............................ 252/68; 508/551, 508/569, 570

(56) References Cited

U.S. PATENT DOCUMENTS

| 4,927,554 A | * | 5/1990 | Jolley et al. | 252/68 |
| 4,963,280 A | * | 10/1990 | Wilkins et al. | 252/68 |
| 5,942,149 A | * | 8/1999 | Weber, III | 252/68 |

* cited by examiner

Primary Examiner—Jacqueline V. Howard
(74) Attorney, Agent, or Firm—Wendy Buskop

(57) ABSTRACT

A method of improving the efficiency of an air conditioning and refrigeration system, comprising introducing into the system a mixture of a carrier with an energy transferring polar compound comprising a sulfur component; a novel additive in a polar compound containing a sulfur component; and an air conditioning system utilizing a polar compound containing a sulfur component.

18 Claims, No Drawings

AIR CONDITIONING AND REFRIGERATION SYSTEM USING A SULFUR CONTAINING POLAR COMPOUND

FIELD OF THE INVENTION

The present invention relates to the improvement in the energy efficiency of air conditioning and refrigerant systems including refrigeration units, and air conditioning systems, which transfer energy from one location to another.

BACKGROUND OF THE INVENTION

Since the early 1970's there has been a constant effort to improve the energy efficiency of cooling units which function on the air conditioning and refrigerant principle. As is well known, air conditioning and refrigerant systems function by relying upon the energy absorbed or released as a compressible fluid undergoes either pressure increase in a compressor or pressure decrease across a valve or other orifice. Typically, these systems rely upon phase changes from the gas to liquid state as a result of changes in pressure to effectuate energy transport. Such air conditioning and refrigerant units are utilized for large commercial installations either for refrigeration or freezing of perishable articles and the like as well as for climate control of large commercial buildings as well as individual dwellings. The energy efficiency of these units has been greatly increased through redesigned compressors, motors and other mechanical and design improvements. Improved methods for lubricating compressors have been developed so as to reduce the frictional energy, which must be overcome in the compressor while new compressor designs have also been developed in an attempt to increase the energy efficiency of the systems.

However, a need still exists for continued energy improvement in the field of air conditioning and refrigerant systems.

SUMMARY OF THE INVENTION

Accordingly, it is an object of the present invention to provide a composition, which is capable of greatly increasing the energy efficiency of air conditioning and refrigerant systems.

A further object of the present invention is to provide a composition, which will be useful both in air conditioning and refrigeration units to improve their energy efficiency. A further object of the present invention is to provide a method for improving the energy efficiency of air conditioning and refrigerant systems.

These and other objects of the present invention, which will become apparent from the description, which follows, have been achieved by introducing into air conditioning and refrigerant systems a composition containing a compound containing polar sites such that there are portions of the molecule, which have low electron densities, and other portions, which have high electron densities into the system. The compound added is selected so as to remain liquid during all phases of the air conditioning and refrigerant cycle. The preferred compound is a sulfur containing polar compound.

Various additional components can be added to the invention including but not limited to metal conditioners, metal stabilizers, antioxidants and corrosion inhibitors, seal conditioners, tracer dyes, broad spectrum biocides, acid scavengers and water displacement additives.

DESCRIPTION OF THE PREFERRED EMBODIMENTS

Typical air conditioning and refrigerant systems in use today rely upon a compressible fluid to transfer the energy from one location to another. The most common energy transfer media are the members of the Freon family as well as ammonia. Ammonia finds particular application in large-scale refrigeration systems such as cold storage units and the like. In addition to these two classes of energy transfer media or compressible fluids, other compressible fluids may be utilized which undergo phase changes under reasonable changes of pressure. Such compressible fluids, which undergo the necessary change from liquid to gaseous states by the change in pressure, are well known in the art and include gases such as carbon dioxide. In general the selection of the energy transfer media is dependent upon a number of design criteria, which are well known. In general, for commercial installations the use of either Freon or ammonia is most preferred. However in special applications media such as carbon dioxide may be utilized.

The present invention relates to use of polyol ester refrigeration oil as the preferred lubrication for CFC, HCFC and HFC refrigerated applications. The present invention, in a preferred embodiment uses a synthetic hydrocarbon lubricant formulated with polyol ester base stocks and additives which provide lubricity stability and resistance to corrosion. As part of an environmental awareness, the present invention relates to lubricants specifically designed to lubricate refrigeration compressors and system components which are ozone friendly, and chlorine free. When the novel compound is used in a refrigeration system, the lubricant exhibits the desired miscibility at critical temperatures, a low viscosity loss, as well as stability for long system life in the air conditioning system.

The polar organic compound of the present invention contains sufficient polar groups so as to provide regions of the molecule, which have high electron densities, and other regions, which have low electron densities. The particular compound selected must obviously be compatible with the compressible fluid being utilized as the energy transfer media and with the materials of construction of the various components of the energy transfer system. Furthermore, the compounds must remain essentially liquid under the operating conditions encountered. That is, there must be only inconsequential solidification in the cold portion or expansion section of the air conditioning and refrigerant system and only minimal volatilization when exposed to the high temperatures on the high pressure side of the system that is, the polar compound is essentially non-compressible under operating conditions. In addition to being compatible with both the energy transfer medium and the materials of construction of the air conditioning and refrigerant system, polar compound must also be selected to be compatible with the lubricants typically encountered in air conditioning and refrigerant systems. As is well known, all air conditioning and refrigerant systems contain a lubricant, which is continuously circulating throughout the system to lubricate the moving parts of the compressor. Typically these lubricants are based upon naphthenic oils. The most common of the lubricants are designated 3GS and 4GS refrigeration oils. Essentially any polar compound meeting the foregoing criteria can be utilized in the practice of the present invention.

The most preferred group of polar compounds are sulfur containing compounds since they handle extreme pressure as a lubricant better than most compositions. This sulfur additive for the polar compound is incorporated to eliminate sulfur "drop-out." It also assists the resulting composition by being anti-wear, and an antioxidant. At 1.0% wt in an appropriate base oil, it will achieve more than 12 load stages on the FZG test ring. In addition the sulfur additive to the polar compound will exhibit good demulsification properties and will not negatively influence AFNOR filtration test results.

The liquid sulfur containing polar compounds must remain liquid throughout the different operating phases of a air conditioning and refrigerant system. While the molecular weight and weight percent of sulfur contained in these materials is not particularly critical, care should be taken not to use materials which contain a high wax content which may solidify in the expansion portion of the air conditioning and refrigerant system. Such waxy materials can build up on valves and other aspects of the system causing malfunction or increase maintenance. Furthermore, the presence of these solid components may impair the achievement of the desired energy improvement. Typically, the liquid sulfur containing polar compounds will contain from about 6 to 24 carbon atoms and from 1 to 12 of a sulfur atoms. The amount of sulfur and the molecular weight of the resulting polar compound determine the relative volatility and solidification points of the compounds. Of the sulfur containing compound, particularly preferred is a product sold by Dover Chemical Corporation, 3676 Davis Road NW, Dover Ohio, 44622 under the trade name Doverlube LS-3208 which is a sulfur containing additive and has the formula Amines, C12–14-ter-alkyl, sulfamates.

Other sulfur containing polar compounds can be used with the amount of sulfur being chosen simply to render the compound sufficiently polar so as to have regions of high electron density while other regions have lower electron density. High and low electron densities are relative and the degree of difference between the two regions need not be great. The key concept is to have a charge distribution in the molecule.

The polarity of the molecule is believed to result in the polar compound physically attaching itself to the metal walls of the air conditioning and refrigerant system. The metal surfaces in the air conditioning and refrigerant system are believed to contain a high electron charge such that the present polar molecule will orientate itself towards and form a van der waals force and bond with the metal surface. Without being bound by any particular theory, it is believed that when the polar compound binds to the metal wall that this results in a reduction in the boundary layer phenomenon which is encountered in the transfer of energy from a fluid contained within a tube through the tube wall to the surrounding fluid. This boundary layer phenomenon reduces the energy transfer coefficient thereby decreasing efficiency. From tests conducted to date, it appears that the utilization of the polar compound significantly reduces the effect of this boundary layer phenomenon. Tests thus far have demonstrated not only lower energy consumption but also substantially increased energy transfer across the energy transfer surfaces. This improved energy transfer is demonstrated by an increase in the energy transfer coefficient for the system and by shorter system cycle times. As a result of the improved energy transfer, one achieves significantly reduced power consumption in the air conditioning and refrigerant system. Further energy savings can be achieved by taking advantage of the increased energy transfer by reducing the overall size of the air conditioning and refrigerant system for any given load thereby resulting in further energy efficiencies from the use of smaller compressors and the like.

The amount of polar compound which must be added to the air conditioning and refrigerant system is simply that sufficient to achieve the desired increase in energy efficiency. Generally speaking the improved energy efficiency is not achieved immediately upon addition of the polar compound to the system but requires a time delay until the polar compound has become dispersed throughout the system. The length of this delay is to an extent determined by the amount of polar compound added to the system. Accordingly, the amount of polar compound added is determined by the size of the system as well as the rate at which one desires the compound to disperse throughout the system. Typically, the amount of polar compound used is determined by the volume of lubricating oil used in the system. The percentage of polar compound will typically range from about 0.1 to about 10, preferably from 0.5 volume percent up to about 5 volume percent of the lubricating oil. More preferably, the quantity of polar compound will range from about 1% to about 2 and ½% of the total lubricant volume. It is preferred that the polar compound be soluble in the lubricant used in the system at the volume percentage of polar compound being utilized. That is, that the solubility of the polar compound exceeds its concentration in the lubricating oil.

In addition to the other physical and chemical properties discussed previously, the polar compound should also be compatible with the lubricating oils.

The polar compound may be introduced into the air conditioning and refrigerant system in any suitable fashion. It may be incorporated into the lubricating oil during the assembly of the system or may be added to the system during operation. If the polar compound is to be added to the system during operation it would be typically injected into the suction side of the compressor. In a particularly preferred embodiment, the polar compound is first dissolved in a carrier compound so as to form a concentrate for easy injection and for better control of the total volume to be added. Generally speaking the carrier component may be any component which is compatible with the air conditioning and refrigerant system under question. Typically, the carrier will comprise the lubricant being utilized to lubricate the system. Still more preferably the carrier is a white oil, a naphthenic mineral oil of high purity. Such white oils are commercially available and include materials such as Texaco Capella WF and its equivalents. The utilization of white oil has the advantage of being compatible with essentially any air conditioning and refrigerant system including both refrigeration and air conditioning. The refrigeration system is the most demanding because of the low temperatures encountered. The carrier compound must remain liquid throughout the entire air conditioning and refrigerant cycle and should not contain substantial quantities of wax which would solidify under operating conditions. The utilization of white oil as a carrier has the advantage of allowing a single composition containing the polar compound to be utilized in essentially any air conditioning and refrigerant system. The concentration of the polar compound in the carrier is not critical and can range from 20 to 80 volume percent and typically is approximately an equivolume mixture.

A preferred polar compound can be a polyol ester of 20 wt %.

The carrier system containing an equal volume mixture of polar compound and carrier may be added to an existing oil system at a 5% rate based on the total quantity of lubricant contained in the system. The rate at which the material is added can be greater or lesser depending upon the concentration of polar compound in the carrier material and the desired final concentration of polar compound in the air conditioning and refrigerant system.

When using halogen containing polar compounds it is preferred to use a stabilizer to prevent free halogen from forming if there is any moisture in the system. The presence of free halide can cause corrosion problems. Suitable stabilizers for sulfur containing compound are commercially available and are typically buffers which will combine with the halogen to render it benign. Such stabilizers are commercially sold by a number of companies including King Industries, Inc., Science Road, Norwalk, Conn., 06852 which is a blend of sulfur containing hydrocarbon. Other commercially available compounds containing halogen inhibitors can be utilized as well. The quantity of stabilizer used is not critical and can range from 0.01 to 20 volume percent based on polar compound preferably 0.01 to 20 volume percent, more preferably from 0.01 to 10 volume percent. The particular stabilizer selected is not critical so long as it buffers for free sulfur and is compatible with the polar compound, the lubricant and remains dissolved under operating conditions.

It has been determined from testing conducted to date that the present composition and method is effective in improving the efficiency of air conditioning and refrigerant systems both using reciprocating and rotary compressors. Substantial improvements in energy efficiency have been found in all sizes of units ranging from a 1 ton unit up to units nominally rated at 800 tons. Energy consumption improvements of greater than 10% have been achieved by the use of this invention.

Various components can be added to the polar compound to enhance the performance of the lubricant.

I. Metal Conditioners

Metal conditioners can be added. A preferred metal conditioner would be a 3,5-di-tert-butyl-4-hydroxyhydrocinnamic acid, blended with a $C_{7-9}$ branched alkyl ester, and a trietary carbon atom united to 3 other carbon atoms, and a nonylated phenylamine derivative, with a calcium salt of dialkyl aromatic sulfonic acid, and aromatic hydrocarbons of special types with unique unsaturation $C_8H_5O_7SNa$.

II. Metal Stabilizers

Metal stabilizers comprising a calcium salt of a dialkyl aromatic sulfonic acid, and methylene-bis-(dibutyldithicarbamate) can be used with the polar compound.

III. Antioxidants and Corrosion Inhibitors

Antioxidants and corrosion inhibitors with a yellow metal deactivator comprising a calcium salt of dialkyl aromatic sulfonic acid, a 3,5-di-tert-butyl-4-hydroxyhydrocinnamic acid, $C_{7-9}$ branched alkyl ester nonylated phenylamine derivative, a calcium salt of dialkyl aromatic sulfonic acid can be used to enhance the novel composition.

IV. Seal Conditioners

Seal conditioners can be used in the invention to enhance and provide longevity for seals in the air conditioning system. A preferred seal conditioner is an esterified heptanol acid created di-ester, such as $C_7H_{16}O_2$.

V. Tracer Dyes

It is contemplated that tracer dyes can be used within the scope of this invention. A fluorescent dye is considered the best mode when used with the novel composition.

VI. Broad Spectrum Biocides

Biocides stop the growth of fungus and biologicals, such as bacteria in the air conditioning systems. A preferred biocide is a 3-iodopropynylbutylcarbamate. It is contemplated that in the most preferred embodiment, two carbamates can be used simultaneously in the invention.

VII. Acid Scavengers

Acid scavengers can be added to the novel composition to prevent corrosion by controlling the free acids created because of the metal tubing used in the air conditioning system such as, calcium salt of dialkyl aromatic sulfonate acid.

VIII. Water Displacement Additive

This additive is added because the polar compound creates a van der waal effect in conjunction with the air conditioning tubing. The additive pulls the water away from the wall, and helps prevent forming of sludge on the sides of the tubing, and prevents blockages in the tubing. The preferred water displacement additive is a calcium salt of dialkyl aromatic sulfonic acid.

The advantages of the present invention are to create a lubricant with a long life, controlled miscibility, a high efficiency system, excellent temperature fluidity, and excellent high temperature stability.

An object of the present invention is to optimize heat transfer in the air conditioning unit, with good low temperature flow properties and does not separate out temperature extrements.

It is another object of the invention to be able to increase or decrease viscosity of the additives.

EXAMPLE

The following test was performed:

| | |
|---|---|
| Equipment Tested: | Crystal Tips Ice Systems Model 402-CAS-161 |
| Tonnage: | 5 Tons |
| Model: | Bristol Compressor |
| Results: | 16.39% Reduction in Run-Time; |
| | 27.28% Increase in Productivity TO FULL BIN OF ICE |
| Pre-Test | Start: 4:54 PM |
| Avg. Temp 78/80*F. | End: 11:30 AM |
| | 18 hrs, 36 min. |
| Post-Test | Start: 4:15 PM |
| Avg. Temp 88/90*F. | End: 7:50 AM |
| | 15 hrs, 35 min. |
| 18.36 − 15.35 divided by 18.36 × 100 = 16.39% Reduction in Run-Time and faster ice production | |
| Adjusted Temperature Differential Ratio = 120 min | |
| 18.36 − 13.35 = 5.01 × 100 = 27.28% Increase in Productivity | |

SPECIFIC PREFERRED FORMULATIONS

A particularly preferred formulation for a lubricant for an air conditioning system would consist of 10 to 30 wt %, preferably 20 wt % of a polyol ester, an amount of either a di-pentol glycol to increase viscosity (q.s. in quantity) or a neo-pentol glycol to lower viscosity or the lubricant; 10 to 20 wt %, preferably 16 wt % of a tracer dye, 1 to 10 wt %, preferably 2 wt % of methylene-bis-(dibutyldithicarbamate), 1 to 10 wt %, preferably 2 wt % of a calcium salt of dialkyly aromatic sulfonic acid, and about 60 wt % of an alkyl sulfamates, preferably a C 12–14-tert-alkyl sulfamate.

Obviously, numerous modifications and variations of the present invention are possible in light of the above teachings. It is therefore to be understood that within the scope of the appended claims, the invention may be practiced otherwise than as specifically described herein.

What is claimed:

1. A method of improving the efficiency of a compressor driven system for removing heat using a compressible liquid refrigerant consisting of a member of the group CFC, HCFC and HFC comprising the step of introducing a lubricant composition into the compressor of the system, wherein said lubricant composition comprises a sulfur containing polar compound and a polyol ester wherein said sulfur containing polar compound is a liquid sulfur containing polar compound containing 6–24 carbon atoms and 1 to 12 sulfur atoms.

2. The method of claim 1, wherein said sulfur containing polar compound is C 12–14-tert alkyl sulfamate.

3. The method of claim 1, wherein said polar compound is present in an amount from 1 to 40 percent by volume of the total volume of lubricant in the compressor.

4. In a compressor driven system for removing heat using a compressible liquid refrigerant consisting of a member of the group CFC, HCFC and HFC, the improvement comprises adding to lubricant in the compressor a sulfur containing polar compound and a polyol ester wherein said sulfur containing polar compound is a liquid sulfur containing polar compound containing 6–24 carbon atoms and 1 to 12 sulfur atoms.

5. An additive for use in lubricants in a system for removing beat using a compressible liquid refrigerant consisting of a member of the group CFC, HCFC and HFC comprising: a sulfur containing polar compound, a polyol ester and a carrier fluid wherein said sulfur containing polar compound is a liquid sulfur containing polar compound containing 6–24 carbon atoms and 1 to 12 sulfur atoms.

6. The method of claim 1, wherein said lubricant composition comprises:

10 to 30 wt % of a polyol ester;

a member of the group consisting of a di-pentol glycol to increase viscosity (q.s, in quantity) or a neo-pentol glycol to lower viscosity of the lubricant;

10 to 20 wt % of a tracer dye;

1 to 10 wt % of methylene-bis-(dibutyldithiocarbamate);

1 to 10 wt % of a calcium salt of dialkyl aromatic sulfonic acid; and about 60 wt % of C 12–14-tert alkyl sulfamate.

7. The additive of claim 5, wherein extreme pressure additives are further mixed with the additive.

8. The additive of claim 5, wherein the carrier fluid is naphthenic oil.

9. The additive of claim 5, further comprising a member of the group consisting of: a metal conditioner, a metal stabilizer, a corrosion inhibitor, an antioxident, a seal conditioner, a tracer dye, a biocide, an acid scavenger, a water displacement additive, and combinations thereof.

10. An additive for lubricants comprising a polyol ester, a dipentol glycol, a methylene-bis-(dibutyldithiocarbamate), a calcium salt of dialkyl aromatic sulfonic acid, and C 12–14-tert alkyl sulfamate.

11. The additive of claim 10, further comprising a tracer dye.

12. The additive of claim 5, for use in an air conditioning system.

13. The additive of claim 5, for use in a refrigeration system.

14. An additive for lubricants comprising a polyol ester, a neo-pentol glycol, a methylene-bis-(dibutyldithiocarbamate), a calcium salt of dialkyl aromatic sulfonic acid, and C 12–14-tert alkyl sulfamate.

15. The additive of claim 14, further comprising a tracer dye.

16. The method of claim 6, wherein said polyol ester is 20 wt %; and wherein said calcium salt of dialkyl aromatic sulfonic acid is 2 wt %.

17. The improvement of claim 4, wherein said sulfur containing polar compound is C 12–14-tert alkyl sulfamate.

18. The additive of claim 5, wherein said sulfur containing polar compound is C 12–14-tert alkyl sulfamate.

* * * * *